United States Patent Office 3,406,199
Patented Oct. 15, 1968

3,406,199
BENZENESULFONYL UREAS AND PROCESS FOR THEIR MANUFACTURE
Helmut Weber, Frankfurt am Main, Walter Aumuller, Kelkheim, Taunus, Rudi Weyer, Frankfurt am Main, Karl Muth, Kelkheim, Taunus, and Felix Helmut Schmidt, Mannheim-Neuostheim, Germany, assignors to Farbwerke Hoechst Aktiengesellschaft vormals Meister Lucius & Bruning, Frankfurt am Main, Germany, a corporation of Germany
No Drawing. Filed Apr. 12, 1965, Ser. No. 447,565
Claims priority, application Germany, Apr. 16, 1964, F 42,627
8 Claims. (Cl. 260—553)

ABSTRACT OF THE DISCLOSURE

Benzenesulfonyl urea compounds that are effective as oral antidiabetics.

---

The present invention provides benzenesulfonyl-ureas of the Formula I

X—CO—NR—Y—phenylene—
SO$_2$—NH—CO—NH—R$^1$ (I)

which, in substance or in form of their salts, possess blood sugar lowering properties and which are distinguished by a strong and particularly long lasting lowering action on the blood sugar level.

In the above Formula I

R is hydrogen, lower alkyl or lower phenylalkyl,
R$^1$ is (a) alkyl, alkenyl or mercaptoalkyl of 2–8 carbon atoms,
(b) alkoxyalkyl, alkylmercaptoalkyl or alkylsulfinylalkyl of 4–8 carbon atoms each, at least 2 of which carbon atoms forming the alkylene portion of the alkoxyalkyl, alkylmercaptoalkyl or alkylsulfinylalkyl,
(c) lower phenylalkyl, phenyl-cyclopropyl,
(d) lower cyclohexylalkyl, cycloheptylmethyl, cycloheptylethyl or cyclooctylmethyl,
(e) endoalkylene-cyclohexyl, endoalkylene-cyclohexenyl, endoalkylene-cyclohexylmethyl or endoalkylene-cyclohexenylmethyl of 1–2 endoalkylene carbon atoms each,
(f) lower alkyl-cyclohexyl, lower alkoxy-cyclohexyl,
(g) cycloalkyl of 5–8 carbon atoms each,
(h) cyclohexenyl, cyclohexenylmethyl,
(i) a heterocyclic nucleus of 4–5 carbon atoms, 0 to 1 oxygen atom, 0 to 1 sulfur atom and up to 2 ethylenic double linkages and
(k) the heterocyclic nucleus defined under (i) bound to the adjacent nitrogen atom via methylene, X is (a) cycloalkyl, cycloalkenyl, lower cycloalkylalkyl, lower cycloalkenylalkyl, lower cycloalkylalkenyl, lower cycloalkenylalkenyl, lower alkylcycloalkyl, or lower alkylcycloalkenyl of 4–8 ring carbon atoms,
(b) endoalkylene-cyclohexyl or endoalkylene-cyclohexenyl of 1–2 endoalkylene carbon atoms,
(c) cycloalkoxyalkyl, cycloalkyl-mercaptoalkyl, cycloalkyl-alkoxyalkyl or cycloalkyl-alkyl-mercaptoalkyl of 4–11 carbon atoms, Y is hydrocarbon of 1–4 carbon atoms.

The present invention furthermore provides a process for the manufacture of the above-specified benzenesulfonyl-ureas of the Formula I. These benzenesulfonyl-ureas can be prepared according to the following methods:

(a) Benzenesulfonyl isocyanates, benzenesulfonyl carbamic acid esters, benzenesulfonyl thiocarbamic acid esters, benzenesulfonyl carbamic acid halides or benzenesulfonyl-ureas, which are substituted by the group

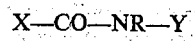

are reacted with R$^1$-substituted amines or, if desired, with their salts.

(b) Benzene-sulfonamides of the formula

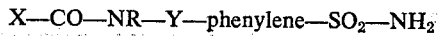

or, if desired, their salts, are reacted with R$^1$-substituted isocyanates, carbamic acid esters, thiocarbamic acid esters, carbamic acid halides or ureas.

(c) Benzenesulfonyl halides substituted by the group X—CO—NR—Y are reacted with R$^1$-substituted ureas, iso-urea ethers, isothiourea ethers or parabanic acids and the benzenesulfonyl-isourea ethers, benzenesulfonyl-isothiourea ethers or benzenesulfonyl-parabanic acids are hydrolysed.

(d) The sulfur atom in correspondingly substituted benzenesulfonyl-thioureas is replaced by an oxygen atom.

(e) Corresponding benzenesulfinyl ureas or benzenesulfenyl-ureas are oxidized.

(f) The radical X—CO— is introduced by acylation into benzenesulfonyl ureas of the formula RHN—Y—phenylene—SO$_2$—NH—CO—NH—R$^1$ If desired, the compounds thus obtained may be hydrogenated in case they contain an unsaturated group in the radical X.

The above-mentioned benzenesulfonyl-carbamic acid esters or benzenesulfonyl-thiocarbamic acid esters may contain a low molecular weight alkyl radical or a phenyl radical in the alcohol component. The same applies to the R$^1$-substituted carbamic acid esters or the corresponding mono-thiocarbamic acid esters. By lower molecular weight or lower alkyl radical, there is to be understood always such a radical containing at most 4 carbon atoms.

As carbamic acid halides, the chlorides are particularly suitable.

The benzenesulfonyl-ureas to be used as starting substances in the process of the present invention may be unsubstituted at the side of the urea molecule opposite to the sulfonyl group or they may be substituted once or twice by lower alkyl or aryl radicals. Instead of benzenesulfonyl-ureas substituted in such manner, there may also be used corresponding N-benzenesulfonyl-N'-acylureas and bis-(benzenesulfonyl)-ureas. Such bis-(benzenesulfonyl)-ureas or N-benzenesulfonyl-N'-acylureas may, for example, be treated with amines R$^1$NH$_2$ and the salts obtained may then be heated to elevated temperatures, in particular to temperatures above 100° C.

Furthermore, it is possible to start from ureas of the formula R$^1$—NH—CO—NH$_2$ or from acylated ureas of the formula R$^1$—NH—CO—NH—acyl, wherein acyl represents preferably a low molecular weight aliphatic or aromatic acid radical or the nitro group, or from phenylureas of the formula

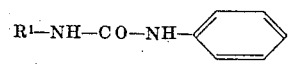

or from diphenyl-ureas of the formula

R$^1$—NH—CO—N(C$_6$H$_5$)$_2$ in which the phenyl radicals may be substituted and linked with one another either directly or through a bridging member such as —CH$_2$—, —NH—, —O— or —S—, or from N,N-disubstituted ureas of the formula

R$^1$—NH—CO—NH—R$^1$ and to react these with benzenesulfonamides substituted by the grouping X—CONH—Y—.

The replacement of the sulfur atom in the correspondingly substituted benzenesulfonyl-thioureas by an oxygen atom can be carried out, for example, with the aid of oxides or salts of heavy metals or even by application of oxidizing agents such as hydrogen peroxide, sodium peroxide or nitrous acid.

As regards the reaction conditions, the forms of realizing the process of the present invention may in general vary within wide limits and adapted to each individual case. For example, the reactions using solvents may be carried out at room temperature or at an elevated temperature.

As starting substances, there are used, on the one hand compounds which contain a benzene radical substituted by the group X—CONR—Y. As examples of the component X—CO— of that formula, there may be mentioned the following groups:

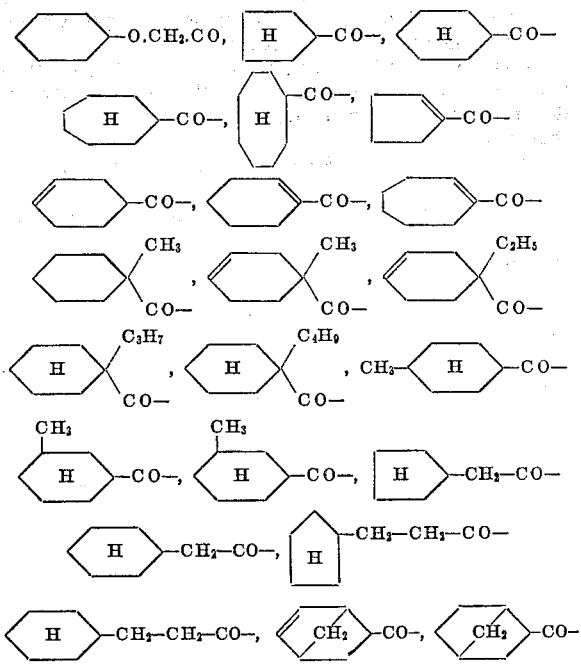

$R^1$ may represent, for example, ethyl, propyl, isopropyl, butyl, isobutyl, sec. butyl, straight chain or branched amyl (pentyl), hexyl heptyl or octyl; radicals which correspond to the mentioned hydrocarbon radicals but contain an ethylenic double linkage, for example allyl or crotyl, furthermore such alkyls having 2–8 carbon atoms which, in addition, carry one mercapto group, for example, β-mercaptoethyl or higher mercaptoalkyls. Furthermore, R' may represent, for example, γ-methoxypropyl, δ-methoxy-n-butyl, β-ethoxyethyl, γ-ethoxypropyl, δ-ethoxybutyl or higher alkyloxyethyls, alkyloxypropyls or alkyloxybutyls and the corresponding groups which carry a sulfur atom or the bridging member —SO— instead of the oxygen atom. Furthermore, there may be used as R' benzyl, α-phenylethyl, β-phenylethyl, α-phenylpropyl, β-phenylpropyl or γ-phenylpropyl or phenylbutyls.

Particularly suitable for the process of the invention are such compounds as contain as R' a cycloaliphatic hydrocarbon radical which may be substituted by alkyl or alkoxy or which may be linked with the nitrogen atom via an alkylene radical. As such radicals, there may be mentioned, for example, cyclopentyl, cyclohexyl, cycloheptyl, cyclooctyl, methylcyclohexyl, ethylcyclohexyl, propylcyclohexyl, isopropylcyclohexyl, methoxycyclohexyl, ethoxycyclohexyl, propoxycyclohexyl, isopropoxycyclohexyl; in these radicals the alkyl or alkoxy groups may be in 2-, 3- or, preferably, 4-position, in both the cis- and the trans-position; furthermore, cyclohexylmethyl, α-cyclohexylethyl or β-cyclohexylethyl, cyclohexylpropyls, endomethylenecyclohexyl - (2,2,1 - tricycloheptyl), endoethylenecyclohexyl - (2,2,2 - tricyclooctyl), endomethylenecyclohexenyl, endoethylenecyclohexenyl, endomethylenecyclohexylmethyl, endoethylenecyclohexylmethyl, endomethylenecyclohexenylmethyl or endoethylenecyclohexenylmethyl, α-phenylcyclopropyl, or β-phenylcyclopropyl, both in cis- and trans-form.

Finally, there are also suitable as R' those heterocyclic rings which, in addition to 4–5 carbon atoms, carry 1 oxygen atom or sulfur atom and up to 2 double linkages and which may be bound to the adjacent nitrogen atom through a methylene group. Examples of such heterocyclic rings are, for example:

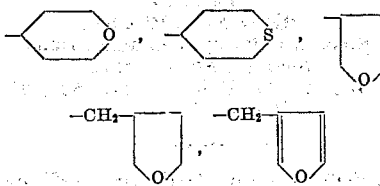

The phenylene radical, designated in the Formula I by "phenylene," may be unsubstituted or substituted once or twice by halogen, lower alkyl or lower alkoxy. It may carry the other parts of the molecule in o-, m- or p-position to one another, the p-position being preferred.

The radical R in the Formula I may represent, for example, methyl, ethyl, propyl, isopropyl, butyl, isobutyl, tert. butyl, benzyl, α- or β-phenylethyl, α-, β- or γ-phenylpropyl. Compounds in which R is methyl or benzyl and especially those in which R is hydrogen are preferred.

The blood sugar lowering action of the benzenesulfonyl urea derivatives described above was determined by measuring over a prolonged period of time, according to the known method of Hagedorn-Jensen or with an autoanalyzer the blood sugar level of rabbits which had been fed with the compounds in doses of 50 milligrams/kilogram (mg./kg.).

Thus, it was found, for example, that N-[4-(β-cyclopentanecarbonamido-ethyl)-benzenesulfonyl] - N' - cyclohexyl urea provoked, after 6 hours, a lowering of the blood sugar level by 37%, whereas upon administration of the known N-(4-methyl-benzenesulfonyl)-N'-n-butyl-urea the blood sugar level was reduced by 30%.

In doses of 10 mg./kg., for example, N-[4-(β-capronamido-ethyl)-benzenesulfonyl] - N' - (4-methylcyclohexyl)-urea lowers the blood sugar level, after 3 hours, by 33%, N - [4 - (β-trimethylacetamido-ethyl)-benzenesulfonyl] - N' - (4-methyl-cyclohexyl)-urea lowers the blood sugar level, after 3 hours, by 24%, and N-[4-(β-trimethyl-acetamido-ethyl) - benzenesulfonyl] - N' - cyclohexyl urea lowers the blood sugar level by 17%.

The strong blood sugar lowering action of the products of the present invention becomes particularly evident when reduced doses are administered. Thus, when N-[4-(β-cyclopentanecarbonamido - ethyl) - benzenesulfonyl]-N'-cyclohexyl urea or N-[4-(β-cyclohexanecarbonamido-ethyl)-benzenesulfonyl] - N' - (4-methyl-cyclohexyl)-urea is administered in doses of 1 mg./kg. to rabbits, a distinct lowering of the blood sugar level can still be observed, whereas the afore-mentioned N - (4 - methyl-benzenesulfonyl)-N'-n-butyl urea is no longer active when administered to rabbits in a dose of less than 25 mg./kg.

The products of the present invention are intended to be used preferably in the manufacture of orally administerable preparations that have blood sugar lowering action in the treatment of diabetes mellitus; they can be applied as such or in form of their salts or in the presence of substances that cause salt formation. For such salt formation, there may be used, for example, alkaline agents such as alkali metal hydroxides, alkaline earth metal hydroxides, alkali metal carbonates and alkaline earth metal carbonates, alkali metal bicarbonates and alkaline earth metal bicarbonates. As medicinal preparations, there enter into consideration preferably tablets which contain, in addition to the products of the invention, the usual adjuvants and carriers such as talc, starch, lactose, tragacanth or magnesium stearate.

A preparation containing the above-mentioned benzenesulfonyl ureas as the active substance, for example, a tablet or a powder, with or without the above-mentioned additives, is suitably processed into a suitable dosage unit form. The dose chosen should comply with the efficacy of the benzenesulfonyl-urea used and with the desired effect. Advantageously, the dosage per unit is in the range of from about 0.5 to 100 mg., preferably 2 to 10 mg. However, considerably higher or lower dosage units may also be used which, if desired, may be divided or multiplied prior to their application.

The following examples illustrate the invention but they are not intended to limit it thereto:

Example 1.—N-[4-(hexahydrobenzamidomethyl)-benzenesulfonyl]-N'-cyclohexyl-urea 29.4 g. of 4-(hexahydrobenzamidomethyl)-benzenesulfonamide are suspended in 250 ml. of acetone. To this suspension, there are added an aqueous solution of 4 g. of sodium hydroxide and then water, until a clear solution is formed. 12.5 g. of cyclohexylisocyanate are added dropwise, while stirring, at room temperature, whereupon a thick precipitate is formed slowly. The whole is stirred for 2 hours, combined with hydrochloric acid and water and then filtered with suction. The N-[4-(hexahydrobenzamido-methyl) - benzenesulfonyl] - N' - cyclohexylurea thus obtained melts at 192° C. (after recrystallization from ethanol).

In analogous manner, there is obtained the N-[4-(hexahydrobenzamidomethyl) - benzenesulfonyl] - N' - butylurea, melting at 186–188° C.

Example 2.—N-[4-($\beta$-endomethylene-2',5'-$\Delta^{3'}$-tetrahydrobenzamido-ethyl)-benzenesulfonyl]-N'-cyclohexyl-urea 16 g. of 4-($\beta$-endomethylene-2',5'-$\Delta^{3'}$-tetrahydrobenzamido-ethyl)-benzenesulfonamide (melting point 149–151° C., prepared from 4-(aminoethyl)-benzenesulfonamide and endomethylene-2,5-$\Delta^3$-tetrahydrobenzoyl chloride) are suspended in 200 ml. of acetone. To this suspension, there is added a solution of 2 g. of sodium hydroxide in a small amount of water and then so much water until a clear solution is formed. To this solution, 6.5 g. of cyclohexyl isocyanate are added dropwise at room temperature, while stirring, and stirring is continued for 2 hours. The reaction mixture is filtered and combined with water and hydrochloric acid. The product is filtered off with suction and recrystallized from a mixture of ethanol and water. The N-[4-($\beta$-endomethylene-2',5'-$\Delta^{3'}$-tetrahydrobenzamido - ethyl) - benzenesulfonyl]N' - cyclohexyl urea melts at 194–196° C.

In analogous manner, there is obtained:

from 4-(endomethylene-2,5, - $\Delta^3$ - tetrahydrobenzamidomethyl)-benzenesulfonamide (melting point 159–161° C.) and cyclohexyl isocyanate:

N-[4 - (endomethylene-2',5'-$\Delta^3$ - tetrahydrobenzamidomethyl)-benzenesulfonyl]-N' - cyclohexyl-urea, melting point 171–173° C.;

from 4-($\beta$-endomethylene-2',5'-hexahydrobenzamido-ethyl)-benzenesulfonamide (melting point 149–151° C.) and cyclohexyl isocyanate:

N - [4-($\beta$ - endomethylene-2',5' - hexahydrobenzamido-ethyl)-benzenesulfonyl]-N'-cyclohexyl-urea, melting point 208–210° C.

Example 3.—N-[4-($\beta$-cyclopentane-carbamido-ethyl)-benzenesulfonyl]-N'-cyclohexyl-urea 12 g. of 4-($\beta$-cyclopentane-carbamidoethyl)-benzenesulfonamide (melting point 162–164° C.) are dissolved in 20.5 ml. of binormal sodium hydroxide solution and 50 ml. of acetone; to this solution, there are added dropwise, at 0–5° C., 5.2 g. of cyclohexyl isocyanate. The whole is stirred for 3 hours, diluted with 100 ml. of water and 50 ml. of methanol, undissolved matter is filtered off and the filtrate is acidified with dilute hydrochloric acid. The precipitated product is filtered off with suction and recrystallized from methanol. The N-[4-($\beta$-cyclopentane-carbamido - ethyl)-benzenesulfonyl]-N'-cyclohexyl-urea melts at 214–215° C.

In analogous manner, there are obtained:

N-[4 - ($\beta$ - cyclopentane-carbamido-ethyl)-benzenesulfonyl]-N'-cyclooctyl-urea, melting point 202–203° C. (from dimethylformamide/water);

N-[4-($\beta$ - cyclopentane - carbamido-ethyl)-benzenesulfonyl]N'-butyl - urea, melting point 184–185° C. (from methanol);

N-[4-($\beta$-cyclopentane - carbamido - ethyl)-benzenesulfonyl]-N'-(4-methyl-cyclohexyl)-urea, melting point 201–202° C. (from methanol);

N-[4-($\beta$-cyclohexane - carbamido - ethyl)-benzenesulfonyl]-N'-cyclooctyl-urea, melting point 205–206° C. (from methanol/dimethylformamide);

N-[4-($\beta$-cyclohexane-carbamido - ethyl) - benzenesulfonyl]-N'-cyclohexyl-urea, melting point 195–196° C. (from methanol/dimethylformamide);

N-[4-($\beta$-cyclohexane - carbamido - ethyl)-benzenesulfonyl]-N'-butyl-urea, melting point 156–157° C. (from methanol);

N-[4-($\beta$-cyclohexane - carbamido - ethyl)-benzenesulfonyl]-N'-(4-methyl-cyclohexyl)-urea, melting point 197–198° C. (from dimethylformamide/water);

N-[4-($\beta$-$\Delta^{3'}$-tetrahydro - benzamido - ethyl)-benzenesulfonyl]-N'-cyclooctyl-urea, melting point 208–209° C. (from dimethylformamide/water);

N-[4-($\beta$-$\Delta^{3'}$ - tetrahydro - benzamido - ethyl) - benzenesulfonyl]-N'-cyclohexyl-urea, melting point 211–212° C. (from methanol);

N-[4-($\beta$-$\Delta^{3'}$-tetrahydro - benzamido - ethyl) - benzenesulfonyl]-N'-butyl-urea, melting point 171–172° C. (from methanol);

N-[4-($\beta$-$\Delta^{3'}$-tetrahydro - benzamido - ethyl) - benzenesulfonyl]-N'-(4-methyl-cyclohexyl)-urea, melting point 198–200° C. (from dimethylformamide/water).

from 4-($\beta$-$\Delta^3$-tetrahydrobenzamido-ethyl)-benzenesulfonamide (melting point 198–200° C.):

N-[4-($\beta$-$\Delta^3$-tetrahydro - benzamido - ethyl) - benzenesulfonyl]-N'-(4-ethylcyclohexyl)-urea (trans), melting point 193–194° C. (from methanol);

from 4-($\beta$-cyclohexane - carbonamido - ethyl) - benzenesulfonamide (melting point 191–192° C.):

N-[4-($\beta$-cyclohexane - carbonamido - ethyl) - benzenesulfonyl]-N'-(4-ethyl-cyclohexyl)urea (trans), melting point 198–199° C. (from methanol).

Example 4.—N-[4-($\beta$-cyclopentane-carbamido-ethyl)-benzenesulfonyl]-N'-(4-ethyl-cyclohexyl)-urea To 17.7 g. of N-[4-($\beta$-cyclopentane-carbamido-ethyl)-benzenesulfonyl]-methylurethane (melting point 118–120° C.) in 100 ml. of toluene, there are added, while stirring, 6.3 g. of 4-ethyl-cyclohexylamine. The temperature is raised to 120–130° C., whereupon the reaction sets in with evolution of methanol. After 30 minutes, the whole is allowed to cool, the precipitated urea is filtered off with suction, washed with benzene and recrystallized from a mixture of dimethylformamide and water. The N-[4-($\beta$-cyclopentane - carbamido - ethyl) - benzenesulfonyl]-N'-(4-ethyl-cyclohexyl)-urea melts at 187–188° C.

In analogous manner, there is obtained:

N-[4-($\beta$-cyclopentane - carbamido - ethyl) - benzenesulfonyl]-N'-(4-methoxy-cyclohexyl)-urea, melting point 200–201° C. (from dimethylformamide/water).

Example 5.—N-[4-($\beta$-1'-methyl-$\Delta^{3'}$-tetrahydro-benzamido-ethyl)-benzenesulfonyl]-N'-cyclohexyl-urea A mixture of 9.1 g. of N-[4-($\beta$-1'-methyl-$\Delta^{3'}$-tetrahydro-benzamido-ethyl)-benzenesulfonyl]-urea (melting point 178° C.), 300 ml. of toluene, 30 ml. of glycol monomethyl ether, 165 g. of glacial acetic acid and 2.8 g. of cyclohexylamine is heated for 5 hours under reflux, while stirring. The mixture is concentrated under reduced pressure, the residue is triturated with alcohol. The N-[4-(β - 1' - methyl - Δ³' - tetrahydro - benzamido - ethyl)-benzenesulfonyl]-N'-cyclohexyl-urea is obtained as crude product is filtered off with suction and dissolved in and allowed to crystallize from a mixture of dimethylformamide and water. Melting point 210–211° C.

In analogous manner, there are obtained:

N - [4 - (β - 1' - methyl - Δ³' - tetrahydro - benzamido-ethyl)-benzenesulfonyl]-N'-butyl-urea, melting point 166–167° C. (from dimethylformamide/water);

N - [4 - (β - 1' - methyl - Δ³' - tetrahydro - benzamido-ethyl) - benzenesulfonyl] - N' - (4 - methyl - cyclohexyl)-urea, melting point 193–195° C. (from methanol).

Example 6.—N-[4-(β-1'-isobutyl-hexahydro-benzamido-ethyl)-benzenesulfonyl]-N'-cyclohexyl-urea 14 g. of 4-(β-1'-isobutyl-hexahydro-benzamido-ethyl)-benzenesulfonamide are dissolved in 100 ml. of acetone and 100 ml. of aqueous sodium hydroxide solution containing 1.5 g. of NaOH. Then, 5 g. of cyclohexyl-isocyanate are added dropwise at room temperature and the whole is stirred for 1 hour at room temperature. After the addition of water, the whole is filtered with charcoal. By acidification, there is first obtained a smeary precipitate which is dissolved in a sodium hydroxide solution having a strength of about 1%. Upon acidification with dilute hydrochloric acid, there is obtained a crystalline precipitate of N-[4-(β-1'-isobutyl-hexahydro-benzamido-ethyl)-benzenesulfonyl]-N'-cyclohexyl-urea which, after dissolution in ammonia and precipitation with HCl, filtration and drying and following recrystallization from methanol, melts at 164–166° C.

Example 7.—N-[4-(β-cyclopentene-2-yl-carbamido-ethyl)-benzenesulfonyl]-N'-cyclohexyl-urea 13.2 g. of N-4-(β-cyclopentene-2-yl-carbonamido-ethyl)-benzenesulfonamide are suspended in 200 ml. of acetone. 12.5 g. of ground potassium carbonate are added to this suspension, while stirring, and the whole is heated for 1½ hours under reflux, while continuously stirring. 5.6 g. of cyclohexyl isocyanate are then added dropwise, while stirring and heating. The whole is further stirred and heated under reflux for 7 hours, the diluent is removed by distillation, the residue is dissolved in water, the solution is filtered and acidified. The N-[4-(β-cyclopentene - 2 - yl - carbamido - ethyl) - benzenesulfonyl]-N'-cyclohexyl-urea obtained as the precipitate is filtered off with suction, dried and recrystallized from methanol. The substance melts at 198–200° C.

Example 8.—N-[4-(β-hexahydro-benzamido-ethyl)-benzenesulfonyl]-N'-cyclohexyl-urea 9 g. of N-[4-(β-hexahydro-benzamido-ethyl)-benzenesulfonyl]-N'-cyclohexyl-thiourea (prepared by the reaction of N-4-(β-hexahydro-benzamido-ethyl)-benzenesulfonamide with cyclohexyl mustard oil in the presence of potassium carbonate and acetone; melting point after recrystallization from methanol: 127–129° C. are dissolved in excess amount of N-sodium hydroxide solution, and an excess amount of hydrogen peroxide having a strength of 3% is added to the solution. The solution is shortly heated on the steam bath. After cooling, the precipitated sulfur is filtered off, the solution is clarified with charcoal and the filtrate is acidified with dilute hydrochloric acid. The N-[4-(β - hexahydro - benzamido - ethyl) - benzenesulfonyl]-N'-cyclohexyl-urea obtained in good yield melts, after recrystallization from a mixture of methanol and dimethylformamide, at 195–196° C.

Example 9.—N-[4-(β-hexahydro-benzamido-ethyl)-benzenesulfonyl]-N'-cyclohexyl-urea 4.5 g. of N-[4-(hexahydro-benzamido-ethyl)-benzenesulfonyl]-N'-cyclohexyl-isourea methyl ether (prepared by the reaction of N-[4-(β-hexahydro-benzamido-ethyl)-benzenesulfonyl]-N'-cyclohexyl-thiourea with mercury oxide in methanol; melting point 120–122° C., after recrystallization from ethyl acetate) in 100 ml. of concentrated hydrochloric acid are heated for 5 minutes on the steam bath. The precipitated N-[4-(β-hexahydro-benzamido-ethyl)-benzenesulfonyl]-N'-cyclohexyl-urea is filtered off with suction, triturated with water and recrystallized from a mixture of methanol and dimethylformamide. Melting point 195–196° C.

Example 10.—N-[4-(β-cycloheptane-carbamido-ethyl)-benzenesulfonyl]-N'-cyclohexyl-urea 15 g. of cycloheptane-carbamido-ethyl-benzenesulfonamide (melting point 181° C.; obtained from 4-amino-ethyl-benzenesulfonamide and cycloheptane-carboxylic acid chloride) are dissolved in 100 ml. of acetone and 23 ml. of binormal sodium hydroxide solution; to this solution, there are added dropwise, at 0–5° C., while stirring, 6.5 g. of cyclohexyl isocyanate. The whole is stirred for 3 hours and then allowed to reach room temperature. The mixture is then acidified, acetone is removed under reduced pressure at room temperature and the residue is recrystallized from a mixture of ethanol and water. Melting point: 186° C.

In analogous manner, there are obtained:

N-[4-(β-cycloheptane - carbamido - ethyl) - benzenesulfonyl]-N'-(4-methylcyclohexyl)-urea, melting point 201° C. (from ethanol);

N-[4-(β-cycloheptene-(1) - carbamido - ethyl) - benzene-sulfonyl]-N'-cyclohexyl-urea, melting point 177° C. (from ethanol);

N-[4-(β-cycloheptene-(1) - carbamido - ethyl) - benzenesulfonyl]-N'-(4-methyl - cyclohexyl) - urea, melting point 165° C. (from methanol);

N-[4-(β-cycloheptene-(1) - carbamido - ethyl) - benzenesulfonyl]-N'-n-butyl-urea, melting point 100° C. (from ethanol/water);

N-[4-(β-cyclohexane - carbamido - propyl) - benzenesulfonyl]-N'-cyclohexyl-urea, melting point 177° C. (from ethanol/water);

N-[4-(β-cyclohexene-(3) - carbamido - propyl) - benzenesulfonyl]-N'-cyclohexyl-urea, melting point 206° C. (from ethanol);

N-[4-(γ-cyclohexane - carbamido - propyl) - benzenesulfonyl]-N'-cyclohexyl-urea, melting point 187° C. (from ethanol);

N-[4-(γ-cyclohexane - carbamido - propyl) - benzenesulfonyl]-N'-n-butyl-urea, melting point 124° C. (from ethanol/water);

N-[4-(γ-cyclohexene - (3) - carbamido - propyl) - benzenesulfonyl]-N'-cyclohexyl-urea, melting point 188° C. (from ethanol).

Example 11.—N-[4-(γ-cyclohexene-(3)-carbamido-propyl)-benzenesulfonyl]-N'-(4-methyl-cyclohexyl)-urea 6.3 g. of N - [4 - (γ-cyclohexene-(3)-carbamido)-propyl]-benzenesulfonamide sodium (prepared from 4-(ω-aminopropyl)-benzenesulfonamide and cyclohexene-(3)-carboxylic acid chloride) together with 11 g. of N,N-diphenyl-N'-(4-methyl-cyclohexyl)-urea in 20 ml. of dimethylformamide are kept for 7 hours at 100° C. After cooling and addition of water and binormal sodium hydroxide solution, the diphenylamine that has formed is shaken out with ether, the aqueous phase is treated with charcoal and acidified. The precipitate that has formed is directly recrystallized from ethanol and a small amount of water. Melting point 192° C.

Example 12.—N-[4-(β-cyclohexyl-propione-amido-ethyl)-benzenesulfonyl]-N'-cyclohexyl-urea 10.1 g. of 4 - (β - cyclohexyl-propione-amido-ethyl)-benzenesulfonamide (melting point 147–149° C.) are suspended in 15 ml. of binormal sodium hydroxide solution and 75 ml. of acetone; to this suspension, 4.2 g. of cyclohexyl isocyanate are added dropwise at 0–5° C. The whole is then stirred for 3 hours, diluted with water and methanol, undissolved matter is filtered off and the filtrate is acidified. The crystals of N-[4-(β-cyclohexyl-propione-amido-ethyl)-benzenesulfonyl]-N'-cyclohexyl - urea melt at 177–179° C. (after single recrystallization from methanol).

In analogous manner, there are obtained:

N-[4-(β-cyclohexyl-propione-amido - ethyl) - benzenesulfonyl]-N'-butyl-urea, melting point 154–155° C. (from methanol);

N-[4-(β-cyclohexyl - acetamido - ethyl) - benzenesulfonyl]-N'-cyclohexyl-urea, melting point 183–184° C. (from methanol);

N-[4-(β-cyclohexyl - acetamido - ethyl) - benzenesulfonyl]-N'-(4-methyl-cyclohexyl)-urea, melting point 209–210° C. (from dimethylformamide/water).

In analogous manner, there is obtained:

from 4 - (β-cyclopentyl-propionamido-ethyl)-benzenesulfonamide (melting point 157° C.) and cyclohexyl isocyanate:

N-[4-(β-cyclopentyl-propionamido-ethyl] - N' - cyclohexyl-urea, melting point 181° C.

Example 13.—N-[2-(β-cyclopentane-carbamido-ethyl)-4-chlorobenzenesulfonyl]-N' - (4 - methyl - cyclohexyl)-urea (trans)

12 g. of 2-(β-cyclopentane-carbonamido-ethyl)-4-chloro-benzenesulfonamide (melting point 210° C.) are suspended in 18.5 ml. of binormal sodium hydroxide solution of 60 ml. of acetone, and 5.5 g. of 4-methylcyclohexylisocyanate (trans) are added dropwise, at 0–5° C., to this suspension. The reaction mixture is stirred for 3 hours, diluted with water, undissolved matter is filtered off and the filtrate is acidified with dilute hydrochloric acid. The N-[2-(β-cyclopentane-carbonamido - ethyl) - 4-chlorobenzenesulfonyl]-N'-(4-methyl - cyclohexyl) - urea (trans) obtained upon recrystallization from methanol melts at 178–180° C.

In a similar manner, there are obtained:

from 4-(β-3-cyclohexyloxy-propionamido-ethyl)-benzenesulfonamide (melting point 122–124° C.):

N - [4 - (β - 3-cyclohexyloxy-propionamido-ethylbenzenesulfonyl] - N' - cyclohexyl-urea, melting point 128–132° C.;

N - [4 - (β - 3-cyclohexyloxy-propionamido-ethyl)-benzenesulfonyl] - N' - (4-methyl-cyclohexyl)-urea, melting point 145–147° C.; and N - [4 - (β - 3-cyclohexyloxy-propionamido-ethyl)-benzenesulfonyl]-N'-butyl-urea, melting point 112–115° C.

from 4-(β-cyclohexyloxy-acetamido-ethyl)-benzenesulfonamide (melting point 162–164° C.):

N - [4 - (β - cyclohexyloxy-acetamido-ethyl)-benzenesulfonyl] - N' - (4-ethyl-cyclohexyl)-urea, melting point 178–180° C.

from 4 - (β-tetrahydro-cinnamoyl-amido-ethyl)-benzenesulfonamide (melting point 170–172° C.):

N - [4 - (β - tetrahydro - cinnamoyl-amido-ethyl)-benzenesulfonyl] - N'-cyclohexyl-urea, melting point 192–194° C.;

N - [4 - (β - tetrahydro-cinnamoyl-amido-ethyl)-benzenesulfonyl]-N'-4-methyl-cyclohexyl-urea, melting point 213–215° C.;

N - [4 - (β - tetrahydro-cinnamoylamido-ethyl)-benzenesulfonyl]-N'-n-butyl-urea, melting point 177–179° C.

Example 14

In a manner analogous to that of Example 2, there is obtained:

N - [4 - (β - endomethylene-2',5'-Δ³'-tetrahydrobenzamidoethyl) - benzenesulfonyl] - N'-(4-ethyl-cyclohexyl)-urea, melting point 178–180° C.;

N - [4 - (β - endomethylene-2',5'-Δ³'-tetrahydrobenzamidoethyl) - benzenesulfonyl]-N'-(butyl)-urea, melting point 173–175° C.;

N - [4 - (β - endomethylene-2',5'-Δ³'-tetrahydrobenzamidoethyl) - benzenesulfonyl] - N'-(4-methyl-cyclohexyl)-urea, melting point 191–193° C.

N - [4 - (endomethylene - 2',5'-Δ³'-tetrahydro-benzamidomethyl) - benzenesulfonyl] - N'-(4-ethyl-cyclohexyl)-urea, melting point 194–196° C.

N - [4 - (β - endomethylene-2',5'-hexahydrobenzamidoethyl) - benzenesulfonyl] - N'-(4-ethyl-cyclohexyl)-urea, melting point 196–198° C.; and N - [4 - (β - endomethylene-2',5'-hexahydrobenzamidoethyl)-benzenesulfonyl]-N'-butyl-urea, melting point 193–195° C.

from 4-(endomethylene-2',5'-hexahydrobenzamido-methyl)-benzenesulfonamide (melting point 166–168° C.):

N - [4 - (endomethylene - 2',5'-hexahydrobenzamidomethyl) - benzenesulfonyl] - N'-(4-methyl-cyclohexyl)-urea, melting point 180–182° C.; and N - [4 - (endomethylene - 2',5'-hexahydrobenzamidomethyl) - benzenesulfonyl]-N'-butyl-urea, melting point 169–171° C.

We claim:

1. A compound selected from the group consisting of
  (a) a benzenesulfonyl urea of the formula

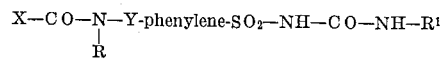

in which
  R is a member selected from the group consisting of hydrogen, lower alkyl and lower phenylalkyl,
  R' is a member selected from the group consisting of
    (a) alkyl, alkenyl and mercaptoalkyl of 2 to 8 carbon atoms each
    (b) alkoxyalkyl, alkylmercaptoalkyl and alkylsulfinylalkyl of 4 to 8 carbon atoms each, at least two of which carbon atoms forming the alkylene portion of the alkoxyalkyl, alkylmercaptoalkyl and alkylsulfinylalkyl,
    (c) lower phenylalkyl, phenyl-cyclopropyl,
    (d) lower cyclohexylalkyl, cycloheptylmethyl, cycloheptylethyl and cyclooctylmethyl,
    (e) endoalkylene - cyclohexyl, endoalkylene-cyclohexenyl, endoalkylene-cyclohexylmethyl and endoalkylene-cyclohexenylmethyl of 1 to 2 endoalkylene carbon atoms each,
    (f) lower alkyl-cyclohexyl, lower alkoxy-cyclohexyl,
    (g) cycloalkyl of 5 to 8 carbon atoms,
    (h) cyclohexenyl, cyclohexenylmethyl,
    (i) a heterocyclic nucleus of 4 to 5 carbon atoms, containing one oxygen atom or one sulfur atom and up to 2 ethylenic double linkages, and
    (k) the heterocyclic nucleus defined under (i) bound to the adjacent nitrogen atom via methylene,
  X is a member selected from the group consisting of
    (a) cycloalkyl, cycloalkenyl, lower cycloalkylalkyl, lower cycloalkenylalkyl, lower cycloalkylalkenyl, lower cycloalkenylalkenyl, lower alkyl cycloalkyl and lower alkyl cycloalkenyl of 4 to 8 ring carbon atoms each,
    (b) endoalkylene-cyclohexyl and endoalkylene-cyclohexenyl of 1 to 2 endoalkylene carbon atoms each,
    (c) cycloalkoxy alkyl, cycloalkylmercapto alkyl, cycloalkyl alkoxyalkyl and cycloalkyl alkylmercapto alkyl of 4 to 11 carbon atoms each,
  Y is alkylene of 1 to 4 carbon atoms and (b) a pharmaceutically acceptable basic salt thereof.

2. Compound of claim 1, wherein R is hydrogen.
3. Compound of claim 1, wherein R¹ is cyclohexyl.

4. Compound of claim 1 wherein R¹ is lower alkyl cyclohexyl.

5. Compound of claim 1, wherein X is cycloalkyl of 4 to 8 carbon atoms.

6. Compound of claim 1, wherein Y is dimethylene.

7. N - [4 - (β - Δ³ - cyclohexenecarbonamido-ethyl)-benzenesulfonyl]-N'-methyl-cyclohexyl urea.

8. N - [4 - (β - cyclohexanecarbonamido-ethyl)-benzenesulfonyl]-N'-(4-methyl-cyclohexyl)-urea.

References Cited

Momose et al., J. Pharm. Soc. Japan, vol. 81, pp. 1045 to 1047 (1961).

Conant, The Chemistry of Organic Compounds, pp. 470–471, 6th printing, The Macmillan Co. (1943).

Chemical Abstracts, vol. 63, cols. 14765–14766 (1965).

JOHN D. RANDOLPH, *Primary Examiner.*